US006877862B2

United States Patent
Fukunaga et al.

(10) Patent No.: US 6,877,862 B2
(45) Date of Patent: Apr. 12, 2005

(54) PROJECTOR (75) Inventors: Hiroaki Fukunaga, Tokyo (JP); Kunitaka Furuichi, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/390,747

(22) Filed: Mar. 19, 2003

(65) Prior Publication Data
US 2003/0179349 A1 Sep. 25, 2003

(30) Foreign Application Priority Data
Mar. 20, 2002 (JP) ........................................ 2002-078742

(51) Int. Cl.[7] .............................................. G03B 21/14
(52) U.S. Cl. ......................................... 353/70; 353/99
(58) Field of Search .............................. 353/51, 69, 70, 353/99

(56) References Cited

U.S. PATENT DOCUMENTS 6,652,104 B2 * 11/2003 Nishida et al. ............... 353/70

FOREIGN PATENT DOCUMENTS

| JP | 5-165097 A | 6/1993 |
| JP | 11-119343 A | 4/1999 |
| JP | 11-125865 A | 5/1999 |
| JP | 2000-171897 A | 6/2000 |
| JP | 2001-33872 A | 2/2001 |
| JP | 2001-51249 A | 2/2001 |
| JP | 2001-305651 A | 11/2001 |

* cited by examiner

Primary Examiner—W. B. Perkey
(74) Attorney, Agent, or Firm—Sughrue Mion, PLLC

(57) ABSTRACT

A reflecting mirror 4d has a rotation axis 7 which is inserted into a bearing 8 of a case 1. Accordingly, the reflecting mirror 4d is capable of rotating with respect to the case 1 and only the reflecting mirror 4d is capable of adjusting the set up angle α made with the case 1. When the set up angle is changed, the reflecting angle of the projected ray on the reflecting mirror 4d is also changed. Therefore, the launching angle of the projected ray 5 with respect to the case 1 can be adjusted.

39 Claims, 6 Drawing Sheets

56
Screen

PROJECTOR

FIELD OF THE INVENTION

The present invention relates to a projector which projects a light from an image formation element on a screen with a projection optical system. More particularly, the present invention relates to a projector which is capable of adjusting a position of an image projected on a screen.

BACKGROUND OF THE INVENTION

Various types of displaying devices have been proposed heretofore. In particular, a projector for enlargement projection of a color picture is proposed as a displaying device for a large-sized screen, in which small mirror surface elements are arranged into a plane according to pixels and in which a specular-reflective-type optical modulator, or an image formation element, utilizing reflection of each mirror surface element is used as a picture source.

Figure 5:
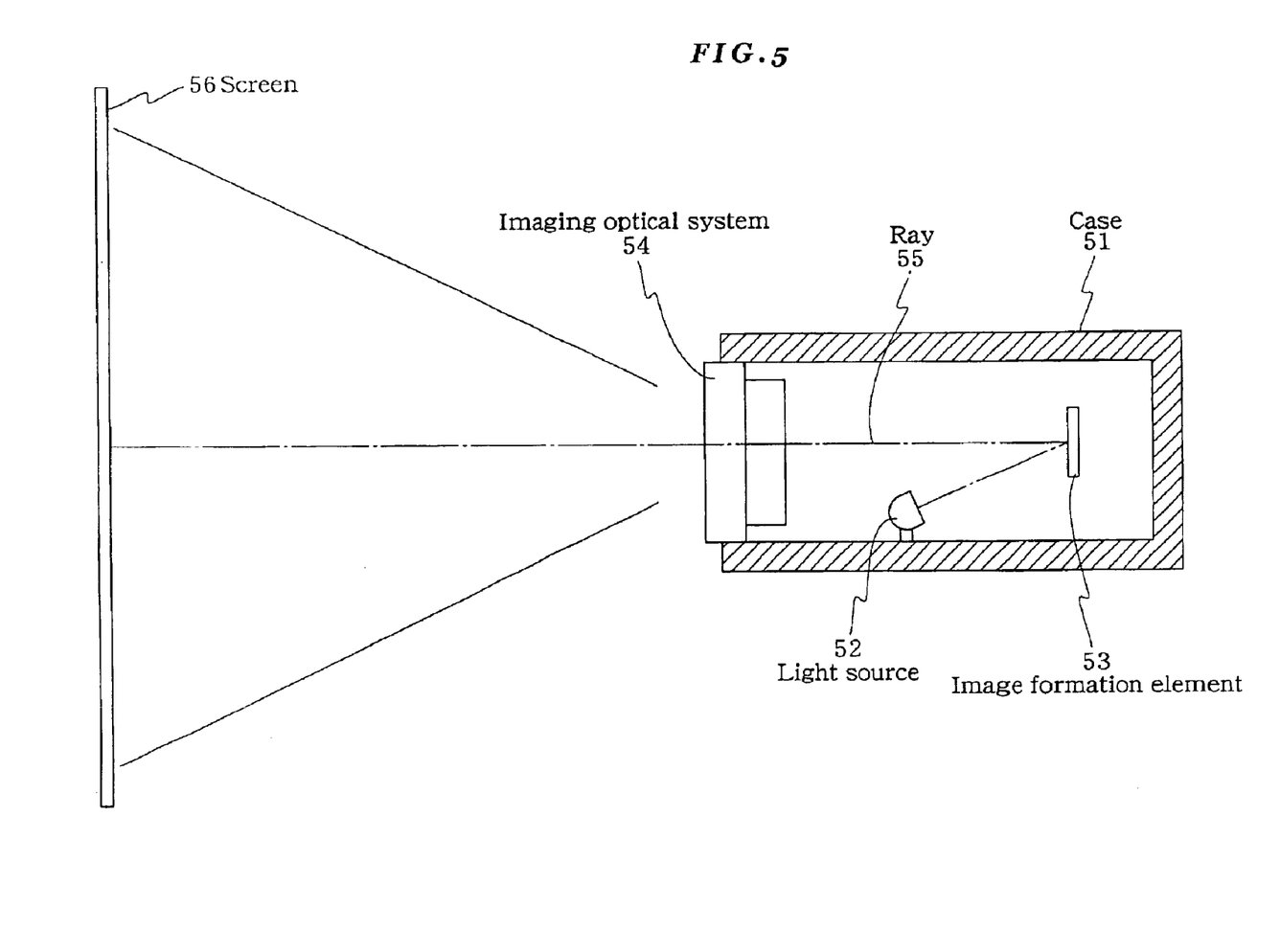
FIG. 5 is a schematic view showing a structure of a conventional projector.

FIG. 5 is a schematic view showing a structure of a conventional projector. Referring to FIG. 5, the conventional projector is provided with a case 51 in which a light source (luminous source) 52, an image formation element (specular-reflective-type optical modulator) 53 and an imaging optical system 54 are arranged. The imaging optical system 54 includes a refracting optical element such as lens and is attached to one side of the case 51.

When a light 55 emitted from the light source 52 is incident in the image formation element 53, it is modulated according to the image generated by the image formation element 53. The modulated light 55 is enlarged by the imaging optical system 54 and output from the case 51 to be projected on the screen 56 as a projected image.

In the conventional projector shown in FIG. 5, the imaging optical system 54, the image formation element 53 and the light source 52 are fixed in the case 51. Accordingly, the position of the projected image is fixed with respect to the case 51. Therefore, in order to change the position of the projected image on the screen 56, the set up state of the case 51, in other words, the set up posture of the projector itself, needs to be tilted.

Figure 6:
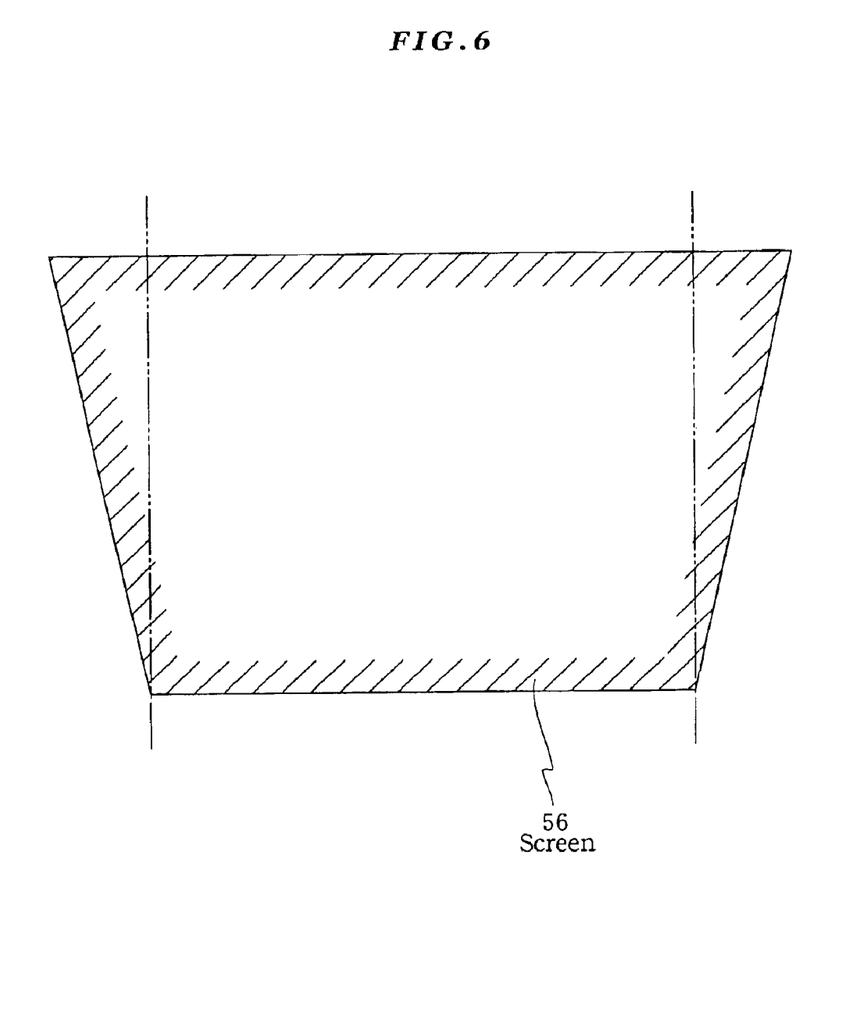
FIG. 6 is a schematic view showing trapezium distortion of a projected image.

An ideal position of the image projected on the screen 56 is determined according to the specification of the projector. In the case where the position of the projected image on the screen 56 is adjusted by tilting the set up position (posture) of the case 51 of the projector, deformation (trapezium distortion) is caused as shown in FIG. 6. In order to acquire projected image without deformation (without trapezium distortion), image signals must be input into the image formation element 53 (i.e., the picture source) according to the length of the shorter side of the trapezium to scale down and modify the length of the longer side of the trapezium, thereby correcting the deformation (trapezium distortion). This requires the operator to manipulate the modification for correction while looking at the projected image.

As described heretofore, according to the conventional projector, the imaging optical system and the like are fixed in the case. Therefore, in order to change the position of the projected image, the set up state of the case itself needs to be changed which is difficult to adjust.

Furthermore, when the case of the conventional projector where it is tilted to adjust the position of the projected image, trapezium distortion of the projected image is caused. In order to acquire a projected image without trapezium distortion, the image signals are input into the image formation element (i.e., the picture source) according to the length of the shorter side of the trapezium to scale down and modify the length of the longer side of the trapezium, thereby correcting the trapezium distortion. This, however, requires the operator to manipulate the modification for correction while looking at the projected image, which is a troublesome work.

SUMMARY OF THE INVENTION

Thus, the present invention has an objective of providing a projector which allows easy adjustment of a position of an image.

In order to achieve the above-described objective, a projector of the present invention comprises a projection optical system for projecting a ray from an image formation element on a screen, wherein: the projection optical system comprises a plurality of reflecting mirrors; and at least one of the plurality of reflecting mirrors is attached to the projector such that a set up angle of the at least one of the plurality of reflecting mirrors is adjustable with respect to the screen.

The projector of the invention is provided with an adjustment mechanism capable of adjusting the set up angle of the reflecting mirror of the projection optical system. Accordingly, the set up angle of the projected light can be changed by the adjustment mechanism without changing the set up state of the projector itself, thereby the position of the image is easily adjusted.

According to one embodiment of the invention, the projector further comprises a linking mechanism for linking the reflecting mirror whose set up angle is to be adjusted to the rest of the reflecting mirrors, thereby adjusting the set up angles of the plurality of reflecting mirrors in a linking manner.

Thus, there is no need of separately adjusting the multiple adjustment mechanisms, thereby rendering the adjustment easy.

According to another embodiment of the invention, the projector further comprises: detecting means for detecting the set up angle of the reflecting mirror to be adjusted; and correcting means for correcting trapezium distortion of an image projected on the screen according to the set up angle detected by the detecting means.

Thus, even when the set up angle of the reflecting mirror is changed, the trapezium distortion of the projected image can easily be corrected.

According to yet another embodiment of the invention, the mechanism for adjusting the set up angle of the reflecting mirror comprises means for externally telling, as a sense of manipulation, that the set up angle is at a predetermined angle.

Thus, the operator of the adjustment mechanism will know by sense of manipulation that the set up angle $\alpha$ is at a predetermined angle.

According to still yet another embodiment of the invention, the projector further comprises displaying means for displaying the set up angle. Accordingly, the operator can confirm the set up angle.

According to another embodiment of the invention, the projector further comprises driving means for driving the reflecting mirror for automatically adjusting the set up angle. Accordingly, adjustment of the set up angle becomes easier. The adjustment mechanism may be provided for adjusting, instead of the set up angle, a set up position of a reflecting mirror.

DETAILED DESCRIPTION OF THE INVENTION

Hereinafter, projectors according to embodiments of the present invention will be described in detail with reference to the drawings.

Embodiment 1

Figure 1:
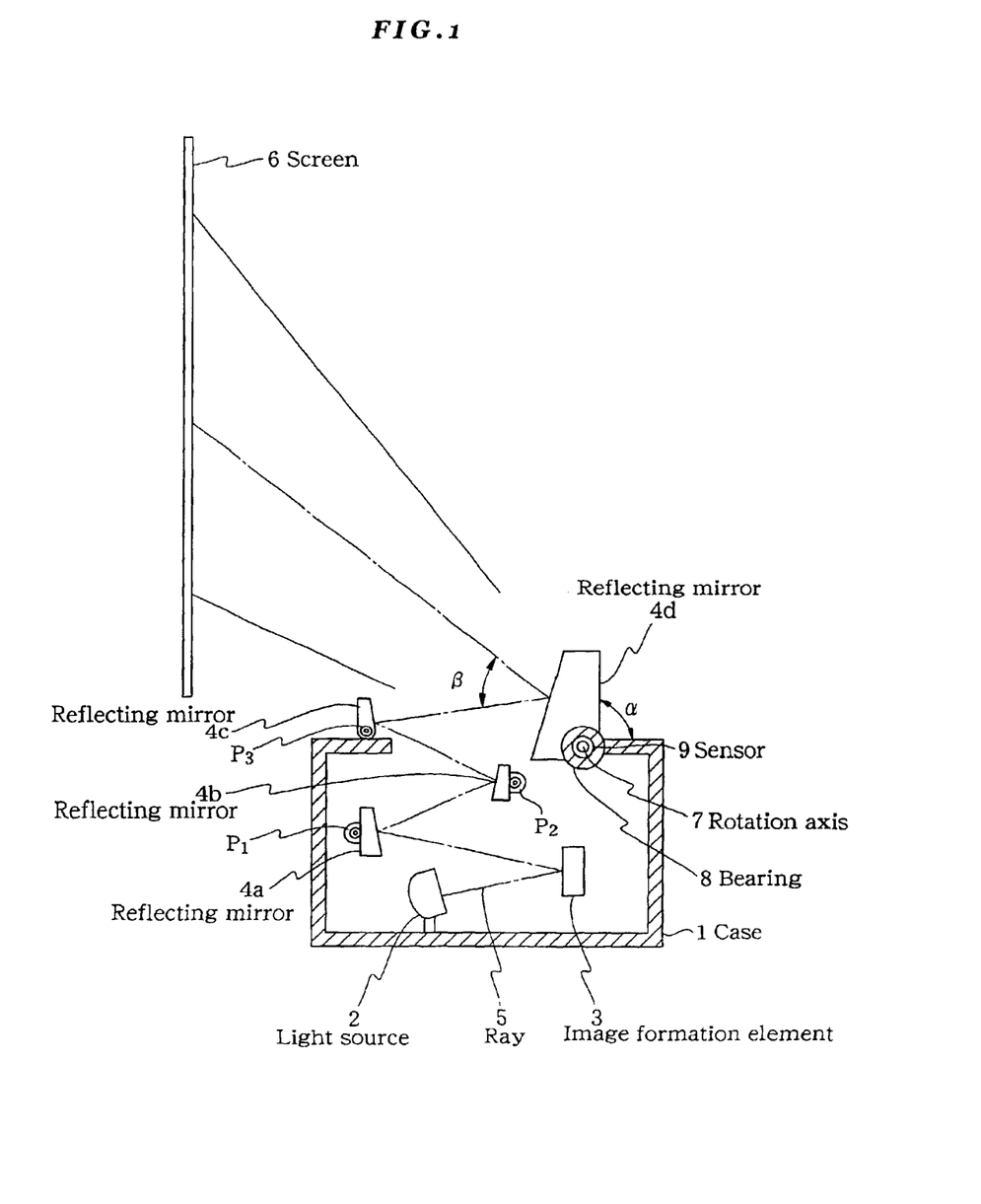
FIG. 1 is a schematic view showing a structure of a projector according to a first embodiment of the invention.

First, a projector according to a first embodiment of the invention will be described. As shown in FIG. 1, the projector according to the present embodiment is provided with a case 1 which serves as a main body of the projector and in which a light source 2, an image formation element 3 and a projection optical system for projecting a ray 5 modulated by the image formation element 3 are arranged. The projection optical system is provided with flat reflecting mirrors 4a, 4b, 4c and 4d as optical elements. A ray emitted from the light source 2 passes through the image formation element 3 and an imaging lens (not shown) of the projection optical system, is reflected by the reflecting mirrors 4a to 4d and is finally projected on a screen 6.

Among the reflecting mirrors 4a to 4d, the mirrors 4a, 4b and 4c are completely secured to the case 1. The reflecting mirror 4d has a rotation axis 7 which is inserted into a bearing 8 of the case 1. Accordingly, the reflecting mirror 4d is capable of rotating with respect to the case 1. Thus, only the mirror 4d is capable of adjusting the set up angle α made with respect to the case 1. Specifically, the rotation axis 7 and the bearing 8 form a mechanism for adjusting the set up angle of the reflecting mirror 4d.

When the set up angle α is changed, the reflection angle β of the light 5 on the reflecting mirror 4d also changes. Therefore, with the projector of the present embodiment, the launching angle of the projected light 5 with respect to the case 1 can be adjusted without changing the set up angle of the projector itself. As a result, the position of the projected image can be adjusted.

Moreover, the projector of the present embodiment is also provided with a sensor 9 for detecting the set up angle α of the reflecting mirror 4d with respect to the case 1. The projector of the present embodiment is further provided with a circuit (correcting means) for automatically reflecting optimal electric correction on picture signals. The optimal electric correction refers to a correction for compensating for the deformation (trapezium distortion) of the projected image on the screen 6, which is caused when the set up angle α detected by the sensor 9 is deviated from the ideal launching angle required by the specification of the projector. Thus, even when the set up angle of the reflecting mirror is changed, the trapezium distortion of the projected image can easily be corrected. A driver for driving the adjustment mechanism may be provided to automatically adjust the set up angle α of the reflecting mirror 4d. This will allow easier adjustment of the set up angle α.

Although only the set up angle of the reflecting mirror 4d is described to be adjustable in the projector of the present embodiment, the present invention is not limited thereto. Adjustment mechanisms P1, P2 and P3 may be provided as well for other reflecting mirrors 4a, 4b and 4c, respectively. In this case, the reflecting mirror 4d and other reflecting mirrors are linked via linking mechanisms or the like so that the set up angle of each reflecting mirror is accordingly adjusted by adjusting the set up angle of the reflecting mirror 4d. Thus, there is no need of separately adjusting the multiple adjustment mechanisms, thereby rendering the adjustment easy.

Figure 2:
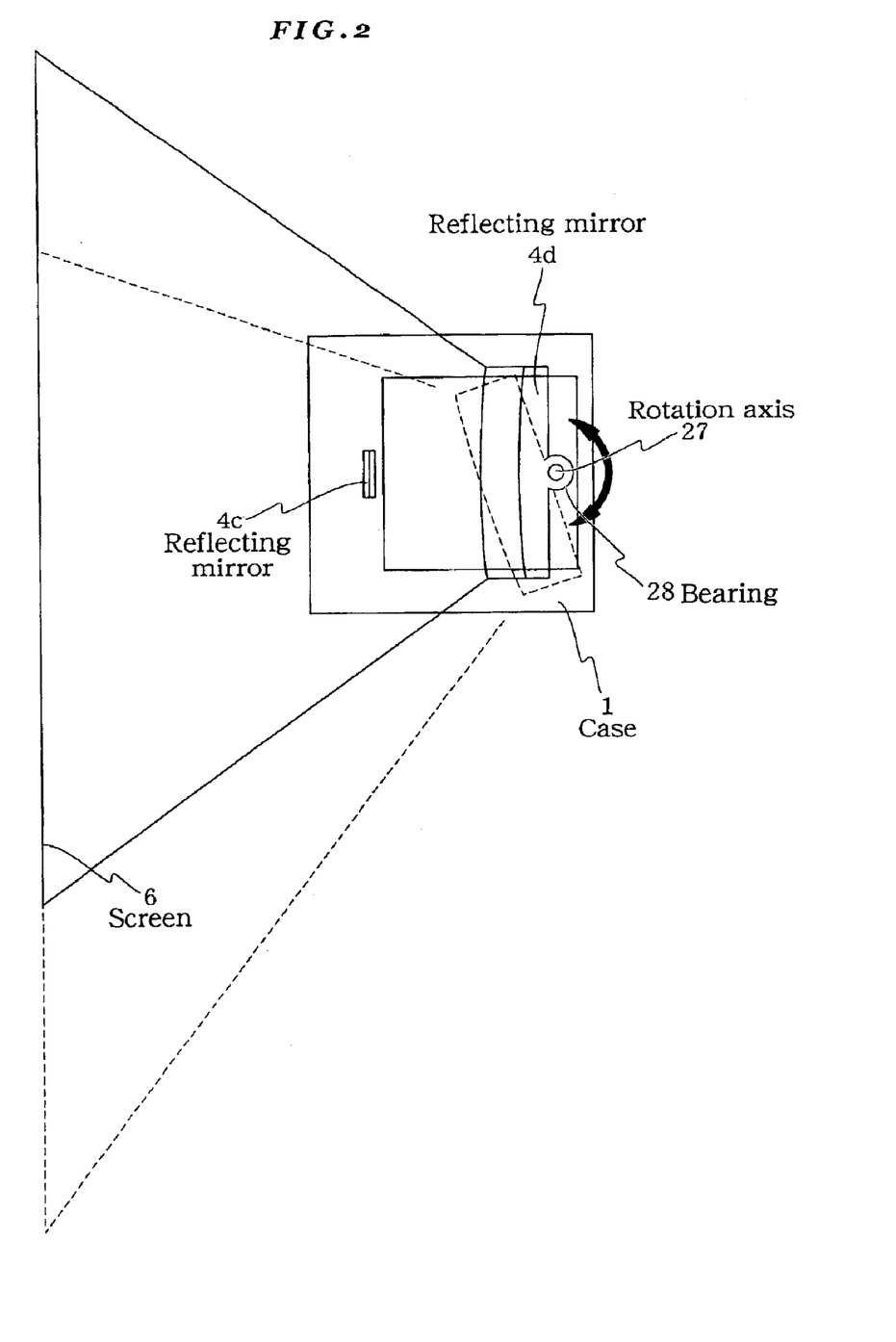
FIG. 2 is a schematic view showing the projector of FIG. 1 seen from above.

FIG. 2 is a schematic view showing the projector of the present embodiment of FIG. 1 seen from above. In this embodiment, the adjustment mechanism for the set up angle α is defined by a tilt of the reflecting mirror 4d in back and forth directions with respect to the projector. As shown in FIG. 2, a rotation mechanism consisting of a rotation axis 27 and a bearing 28 may be provided which allows the set up angle of the reflecting mirror 4d to be adjusted in left and right directions (up and down directions in FIG. 2) for adjusting the position of the image projected on the screen 6. A rotation mechanism for the reflecting mirror 4d may also be provided such that the rotation axis extends along the axis line perpendicular to the projected image (in the direction along the normal vector of the screen 6) for adjusting the position of the image projected on the screen 6.

Figure 3:
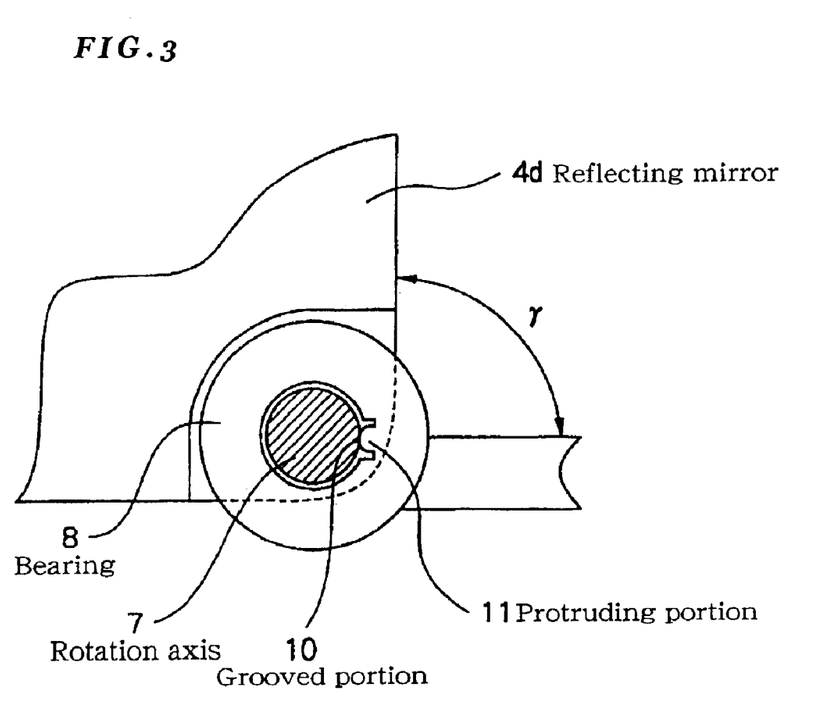
FIG. 3 is a schematic view showing an adjustment mechanism in the projector according to the first embodiment of the invention.

In addition, as shown in FIG. 3, the angle adjustment mechanism may be provided with a grooved portion 10 on the rotation axis 7 and a protruding portion 11 on the bearing 8 which engage with each other when the set up angle α of the reflecting mirror 4d makes a predetermined angle γ. This will tell the operator that the angle of the reflecting mirror 4d is at angle γ as a sense of manipulation (a click feeling that can be felt when the protruding portion is caught in the groove portion). Thus, the operator of the adjustment mechanism will know by sense of manipulation that the set up angle α is at a predetermined angle γ.

By setting angle γ of the reflecting mirror 4d to a position where the reflecting mirror 4d is sufficiently tilted (e.g., position where α=180°), the groove portion 10 and the protruding portion 11 can serve as supporting members for accommodating the reflecting mirror 4d. A display device having an emitter such as an LED may also be provided to inform the operator that the reflecting mirror 4d is at angle γ.

As described above, the projector of the present embodiment is provided with an adjustment mechanism capable of adjusting the set up angle of the reflecting mirror 4d. Therefore, the set up angle of the projected ray 5 can be changed with the adjustment mechanism without changing the set up state of the projector itself, thereby easily adjusting the position of the image.

According to the present embodiment, a flat mirror is used to adjust the optical axis. This is preferable than adjusting the optical axis with an imaging focusing mirror having curved surface because the occurrence of trapezium distortion caused in the projected image can be minimized and the amount of out-of-focus can be minimized.

Embodiment 2

Figure 4:
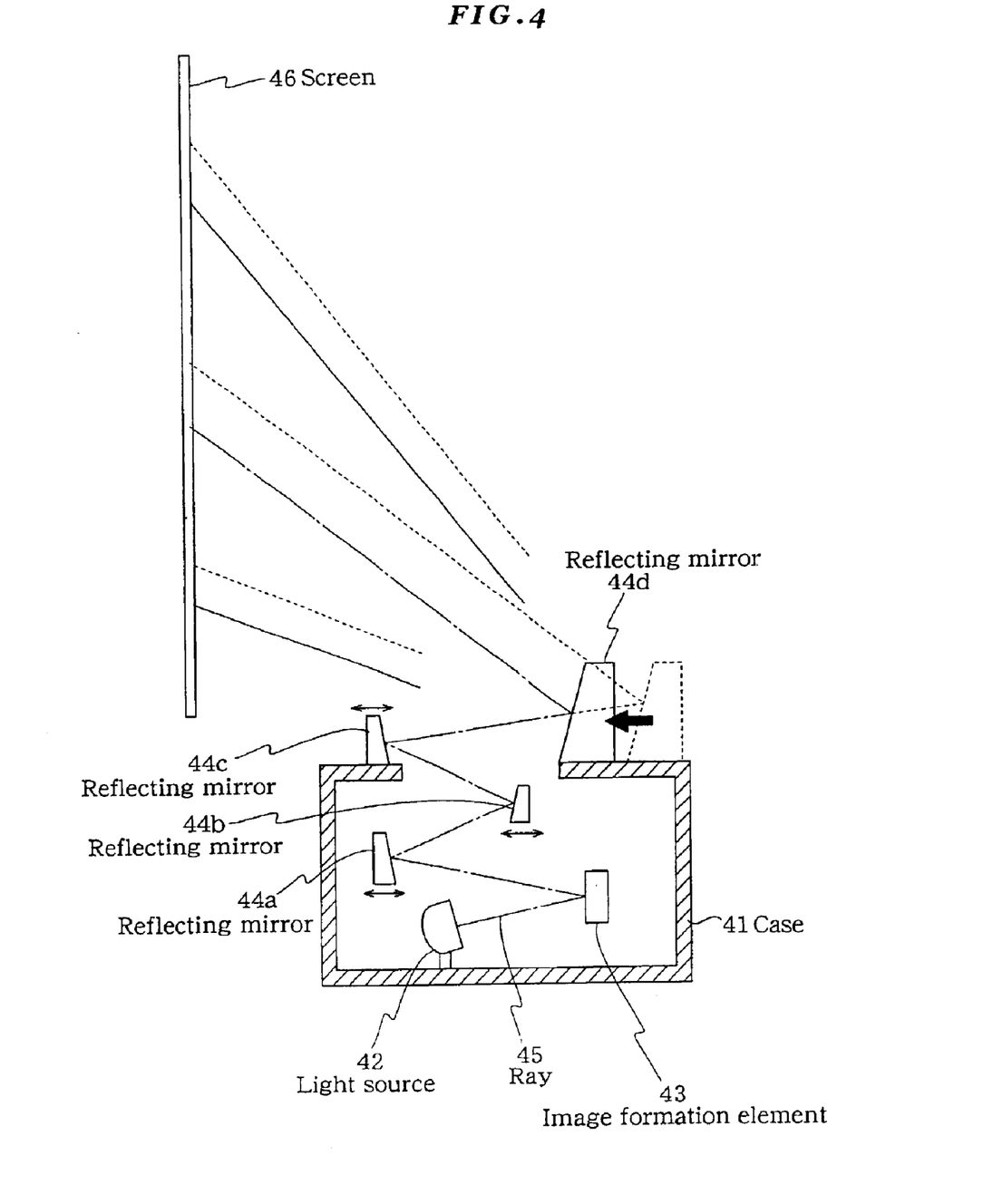
FIG. 4 is a schematic view showing a structure of a projector according to a second embodiment of the invention.

Next, a projector according to a second embodiment of the invention will be described. FIG. 4 is a schematic view showing a structure of the projector of the present embodiment. As shown in FIG. 4, the projector according to the present embodiment is provided with a case 41 in which a light source 42, an image formation element 43 and a projection optical system for projecting a ray 45 on a screen 46 are arranged. The projection optical system is provided with reflecting mirrors 44a, 44b, 44c and 44d as optical elements. A light 45 emitted from the light source 42 passes through the image formation element 43 and an imaging focusing lens (not shown) of the projection optical system, is reflected by the reflecting mirrors 44a to 44d and is finally projected on the screen 46.

The reflecting mirrors 44a, 44b and 44c are completely secured to the case 41. Only the reflecting mirror 44d is provided with an adjustment mechanism which allows the reflecting mirror on the case 41 to move in back and forth directions (right and left directions in FIG. 4) with respect to the projector. When the reflecting mirror 44d moves on the case 41, the reflected position of the light 45 on the reflecting mirror 44d changes. As a result, the position of the image projected on the screen 46 can be adjusted. The other reflecting mirrors 44a, 44b and 44c may also be provided with the above-described adjustment mechanism (the mechanism indicated by an arrow). In this case, the other reflecting mirrors 44a, 44b and 44c are linked to each other to move in cooperation with each other, thereby adjusting the reflecting position of each of the mirrors 44a, 44b and 44c.

Although movement of the reflecting mirror 44d is defined as a movement in back and forth directions with respect to the projector, the reflecting mirror may also be movable in up and down directions (up and down directions in FIG. 4) and left and right directions (directions perpendicular to the plane of FIG. 4) so that positional adjustment of the projected image can be diversified. Moreover, the projector of the present embodiment may be provided with a sensor (detecting means) for detecting the position of the reflecting mirror 44d with respect to the case 41. The projector of the present embodiment may further be provided with a circuit for automatically reflecting optimal electric correction on picture signals. The optimal electric correction refers to a correction for compensating for the deformation (trapezium distortion) of the projected image on the screen 46 according to the detected position of the reflecting mirror 44d. A driver for driving the adjustment mechanism may be provided to automatically adjust the set up position of the reflecting mirror 44d. This will allow easier adjustment of the set up angle.

Although only the position of the reflecting mirror 44d is described to be adjustable in the projector of the present embodiment, the present invention is not limited thereto. The set up angle of the reflecting mirror 44d may also be adjustable as described in Embodiment 1 so that an image projected on the screen can be adjusted minutely.

As described above, a projector of the invention is provided with an adjustment mechanism capable of adjusting a set up angle of a reflecting mirror of a projection optical system. Therefore, the angle of the projected ray can be altered by the adjustment mechanism without altering the set up state of the projector itself, thereby easily adjusting the position of the image.

In addition, in the projector of the invention, there is no need of manually correcting deformation (trapezium distortion) of the projected image upon adjusting the position of the projected image with a reflecting mirror. Thus, suppression of deformation (trapezium distortion) is easy.

What is to be claimed:

1. A projector comprising a projection optical system for projecting a light from an image formation element on a screen, wherein:
   the projection optical system comprises a plurality of reflecting mirrors;
   at least one of the plurality of reflecting mirrors is attached to the projector such that a set up angle of the at least one of the plurality of reflecting mirrors is adjustable with respect to the screen; and
   the reflecting mirror in which the set up angle is adjustable is linked to the rest of the reflecting mirrors.

2. A projector according to claim 1, further comprising a mechanism for linking the reflecting mirror whose set up angle is to be adjusted to the rest of the reflecting mirrors, wherein the mechanism adjusts the set up angles of the plurality of reflecting mirrors in a linking manner.

3. A projector according to claim 1, further comprising:
   detecting means for detecting the set up angle of the reflecting mirror to be adjusted; and
   correcting means for correcting trapezium distortion of an image projected on the screen according to the set up angle detected by the detecting means.

4. A projector according to claim 1, wherein a mechanism for adjusting the set up angle of the reflecting mirror comprises means for externally conveying, as a sense of manipulations that the set up angle is at a predetermined angle.

5. A projector according to claim 1, further comprising displaying means for displaying the set up angle.

6. A projector according to claim 1, further comprising driving means for driving the reflecting mirror for automatically adjusting the set up angle.

7. A projector comprising a projection optical system for projecting a light from an image formation element on a screen, wherein:
   the projection optical system comprises a plurality of reflecting mirrors; and
   at least one of the plurality of reflecting mirrors is attached to the projector such that the set up position of the at least one of the plurality of reflecting mirrors is adjustable with respect to the screen,
   the projector further comprising a linking mechanism for linking the reflecting mirror whose set up position is to be adjusted to the rest of the reflecting mirrors, thereby adjusting the set up positions of the plurality of reflecting mirrors in a linking manner.

8. A projector according to claim 7, further comprising: detecting means for detecting the set up position of the reflecting mirror to be adjusted; and correcting means for correcting trapezium distortion of an image projected on the screen according to the set up position detected by the detecting means.

9. A projector according to any one of claim 7 or 8, wherein the mechanism for adjusting the set up position of the reflecting mirror comprises means for externally conveying, as a sense of manipulation, that the set up position is at a predetermined position.

10. A projector according to claim 7, further comprising displaying means for displaying the set up position.

11. A projector according to claim 7, further comprising driving means for driving the reflecting mirror for automatically adjusting the set up position.

12. A projector according to any one of claims 7 or 8, wherein at least a second reflecting mirror of the reflecting mirrors is provided with a mechanism for adjusting the set up position of the second reflecting mirror with respect to the screen.

13. A projector according to claim 9, wherein at least a second reflecting mirror of the reflecting mirrors is provided with a mechanism for adjusting the set up position of the second reflecting mirror with respect to the screen.

14. A projector according to claim 7, further comprising displaying means for displaying the set up position.

15. A projector according to claim 7, further comprising driving means for driving the reflecting mirror for automatically adjusting the set up position.

16. A projector comprising a projection optical system for projecting a light from an image formation element on a screen, wherein:
   the projection optical system comprises a plurality of reflecting mirrors;
   at least one of the plurality of reflecting mirrors is attached to the projector such that the set up position of the at least one of the plurality of reflecting mirrors is adjustable with respect to the screen; and
   the reflecting mirror in which the set up position is adjustable is linked to the rest of the reflecting mirrors.

17. A projector according to claim 16, further comprising a mechanism for linking the reflecting mirror whose set up position is to be adjusted to the rest of the reflecting mirrors, wherein the mechanism adjusts the set up positions of the plurality of reflecting mirrors in a linking manner.

18. A projector according to claim 16, further comprising:
   detecting means for detecting the set up position of the reflecting mirror to be adjusted; and
   correcting means for correcting trapezium distortion of an image projected on the screen according to the set up position detected by the detecting means.

19. A projector according to claim 16, wherein the mechanism for adjusting the set up position of the reflecting mirror comprises means for externally conveying, as a sense of manipulation, that the set up position is at a predetermined position.

20. A projector according to claim 16, further comprising displaying means for displaying the set up position.

21. A projector according to claim 16, further comprising driving means for driving the reflecting mirror for automatically adjusting the set up position.

22. A projector according to claim 16, wherein at least of the rest of the reflecting mirrors is provided with a mechanism for adjusting the set up position of the reflecting mirror with respect to the screen.

23. A projector comprising a projection optical system for projecting a light from an image formation element on a screen, wherein:
   the projection optical system comprises reflecting mirrors; and
   a final reflecting mirror of the reflecting mirrors is attached to an attachment surface of the projector such that a set up angle and set up position of the final reflecting mirror are adjustable with respect to the screen.

24. A projector according to claim 23, further comprising a linking mechanism for linking the final reflecting mirror to the rest of the reflecting mirrors, to thereby adjust the set up angles or set up positions of the rest of the reflecting mirrors in a linking manner.

25. A projector according to claim 23, further comprising: detecting means for detecting the set up angle or set up position of the final reflecting mirror; and correcting means for correcting trapezium distortion of an image projected on the screen according to the set up angle or set up position of the final reflecting mirror detected by the detecting means.

26. A projector according to claim 24, further comprising: detecting means for detecting the set up angle or set up position of the final reflecting mirror; and correcting means for correcting trapezium distortion of an image projected on the screen according to the set up angle or set up position of the final reflecting mirror detected by the detecting means.

27. A projector according to claim 23, wherein a mechanism for adjusting the set up angle or set up position of the final reflecting mirror comprises means for externally conveying, as a sense of manipulation, that the set up angle is at a predetermined angle or the set up position is at a predetermined position.

28. A projector according to claim 23, further comprising displaying means for displaying the set up angle or set up position.

29. A projector according to claim 23, further comprising driving means for driving the final reflecting mirror for automatically adjusting the set up angle or set up position.

30. A projector according to claim 23, wherein a reflection surface angle measured between a reflective surface of the final reflecting mirror and the attachment surface of the projector is obtuse.

31. A projector comprising a projection optical system for projecting a light from an image formation element on a screen, wherein:
   the projection optical system comprises a plurality of reflecting mirrors; and
   at least one of the plurality of reflecting mirrors is attached to the projector such that a set up angle of the at least one of the plurality of reflecting mirrors is adjustable with respect to the screen,
   the projector further comprising a linking mechanism for linking the reflecting mirror whose set up angle is to be adjusted to the rest of the reflecting mirrors, thereby adjusting the set up angles of the plurality of reflecting mirrors in a linking manner.

32. A projector according to claim 31, further comprising: detecting means for detecting the set up angle of the reflecting mirror to be adjusted; and correcting means for correcting trapezium distortion of an image projected on the screen according to the set up angle detected by the detecting means.

33. A projector comprising a projection optical system for projecting a light from an image formation element on a screen, wherein:
   the projection optical system comprises a plurality of reflecting mirrors; and
   at least one of the plurality of reflecting mirrors is attached to the projector such that a set up angle of the at least one of the plurality of reflecting mirrors is adjustable with respect to the screen; and
   a mechanism for adjusting the set up angle of the reflecting mirror comprises means for externally conveying, as a sense of manipulation, that the set up angle is at a predetermined angle.

34. A projector according to claim 7, wherein the at least one of the plurality of reflecting mirrors is translatably adjustable along an outer surface of the projector to adjust the set up position.

35. A projector comprising a projection optical system for projecting a light from an image formation element on a screen, wherein:
   the projection optical system comprises a plurality of reflecting mirrors; and
   at least one of the plurality of reflecting mirrors is attached to the projector such that the set up position of the at least one of the plurality of reflecting mirrors is adjustable with respect to the screen, the projector further comprising: detecting means for detecting the set up position of the reflecting mirror to be adjusted; and correcting means for correcting trapezium distortion of an image projected on the screen according to the set up position detected by the detecting means, wherein the mechanism for adjusting the set up position of the reflecting mirror comprises means for externally conveying, as a sense of manipulation, that the set up position is at a predetermined position.

36. A projector comprising a projection optical system for projecting a light from an image formation element on a screen, wherein:

the projection optical system comprises a plurality of reflecting mirrors; and at least one of the plurality of reflecting mirrors is attached to the projector such that the set up position of the at least one of the plurality of reflecting mirrors is adjustable with respect to the screen, the projector further comprising: detecting means for detecting the set up position of the reflecting mirror to be adjusted; and correcting means for correcting trapezium distortion of an image projected on the screen according to the set up position detected by the detecting means, wherein at least a second reflecting mirror of the reflecting mirrors is provided with a mechanism for adjusting the set up position of the second reflecting mirror with respect to the screen.

37. A projector comprising a projection optical system for projecting a light from an image formation element on a screen, wherein:

the projection optical system comprises a plurality of reflecting mirrors; and at least one of the plurality of reflecting mirrors is attached to the projector such that the set up position of the at least one of the plurality of reflecting mirrors is adjustable with respect to the screen, wherein the mechanism for adjusting the set up position of the reflecting mirror comprises means for externally conveying, as a sense of manipulation, that the set up position is at a predetermined position.

38. A projector according to claim 37, wherein at least a second reflecting mirror of the reflecting mirrors is provided with a mechanism for adjusting the set up position of the second reflecting mirror with respect to the screen.

39. A projector comprising a projection optical system for projecting a light from an image formation element on a screen, wherein:

the projection optical system comprises a plurality of reflecting mirrors; and at least one of the plurality of reflecting mirrors is attached to the projector such that the set up position of the at least one of the plurality of reflecting mirrors is adjustable with respect to the screen, wherein at least a second reflecting mirror of the reflecting mirrors is provided with a mechanism for adjusting the set up position of the second reflecting mirror with respect to the screen.

* * * * *